US012693420B2

(12) United States Patent
Hwang et al.

(10) Patent No.: US 12,693,420 B2
(45) Date of Patent: Jul. 28, 2026

(54) METHOD AND SYSTEM FOR DETECTING LANE LINE BASED ON LIDAR DATA

(71) Applicant: Vueron Technology Co., Ltd., Seoul (KR)

(72) Inventors: Jae Wook Hwang, Seoul (KR); Chang Hwan Chun, Seoul (KR)

(73) Assignee: Vueron Technology Co., Ltd., Seoul (KR)

( * ) Notice: Subject to any disclaimer, the term of this patent is extended or adjusted under 35 U.S.C. 154(b) by 1044 days.

(21) Appl. No.: 17/813,401

(22) Filed: Jul. 19, 2022

(65) Prior Publication Data

US 2023/0023199 A1     Jan. 26, 2023

(30) Foreign Application Priority Data

Jul. 21, 2021     (KR) ......................... 10-2021-0095890

(51) Int. Cl.
*G01S 17/89* (2020.01)
*G01S 7/48* (2006.01)
*G01S 7/487* (2006.01)
*G01S 17/10* (2020.01)
*G06F 30/20* (2020.01)
*B60W 60/00* (2020.01)
*G06F 111/10* (2020.01)

(52) U.S. Cl.
CPC ............ *G01S 17/89* (2013.01); *G01S 7/4808* (2013.01); *G01S 7/487* (2013.01); *G01S 17/10* (2013.01); *G06F 30/20* (2020.01); *B60W 60/0015* (2020.02); *B60W 2420/408* (2024.01); *G06F 2111/10* (2020.01)

(58) Field of Classification Search
CPC ........ G01S 17/89; G01S 7/4808; G01S 7/487; G01S 17/10; G01S 17/42; G01S 17/931; G06F 30/20; G06F 2111/10; B60W 60/0015; B60W 2420/408
See application file for complete search history.

(56) References Cited

U.S. PATENT DOCUMENTS

2020/0142067 A1* 5/2020 Wang .................... G01S 17/931
2024/0378898 A1* 11/2024 Choi .................... G01S 17/931

FOREIGN PATENT DOCUMENTS

| KR | 10-1843866 B1 | 5/2018 |
| KR | 10-2083909 B1 | 3/2020 |
| KR | 10-2020-0065590 A | 6/2020 |
| KR | 10-2021-0028294 A | 3/2021 |
| KR | 10-2228278 B1 | 3/2021 |

* cited by examiner

*Primary Examiner* — Rodney A Butler
(74) *Attorney, Agent, or Firm* — You & IP, LLC

(57) ABSTRACT

A method of detecting a lane line based on lidar data can include detecting, by a processor, points each estimated as a lane line in a lidar data, performing, by the processor, an estimation operation of estimating parameters of a mathematical model using the detected points, and performing, by the processor, a setting operation of calculating distances between each of the detected points and the mathematical model in which the parameters are estimated and setting the calculated distances as scores. The method can further include performing, by the processor, a summation operation of summing the scores, and setting, by the processor, the mathematical model determined according to the summation score as a lane line.

7 Claims, 10 Drawing Sheets

(a)                                    (b)

METHOD AND SYSTEM FOR DETECTING LANE LINE BASED ON LIDAR DATA

CROSS-REFERENCE TO RELATED APPLICATION

This application claims priority to and the benefit of Korean Patent Application No. 10-2021-0095890, filed on Jul. 21, 2021, the disclosure of which is incorporated herein by reference in its entirety.

BACKGROUND

1. Field of the Invention

The present invention relates to a method and system for detecting a lane line based on lidar data, and more particularly, to a method and system for detecting a lane line based on lidar data for accurately detecting a lane line which means a line painted on a road for a vehicle.

2. Discussion of Related Art

Autonomous vehicles are vehicles that can detect their surrounding environments and move safely without human assistance. The autonomous vehicle may detect the surrounding environment using various sensors. In order for the autonomous vehicle to safely move on roads, lane lines should be accurately detected.

SUMMARY OF THE INVENTION

The present invention is directed to providing a method and system for detecting a lane line based on lidar data for accurately detecting a lane line which means a line painted on a road.

According to an aspect of the present invention, there is provided a method of detecting a lane line based on lidar data, which includes detecting, by a processor, points each estimated as a lane line in a lidar data, performing, by the processor, an estimation operation of estimating parameters of a mathematical model using the detected points, performing, by the processor, a setting operation of calculating distances between each of the detected points and the mathematical model in which the parameters are estimated and setting the calculated distances as scores, performing, by the processor, a summation operation of summing the scores, and setting, by the processor, the mathematical model determined according to the summation score as a lane line.

The method of detecting the lane line based on the lidar data may further includes performing, by the processor, a sampling operation of randomly sampling points from the detected points, wherein the processor estimates parameters of a mathematical model using the sampled points.

The method of detecting the lane line based on the lidar data may further includes repeatedly performing, by the processor, the sampling operation, the estimation operation, the setting operation, and the summation operation a predetermined number of times and finding parameters of the mathematical model having a highest summation score, wherein the processor sets the mathematical model having the highest summation score as the lane line.

The processor may assign a higher score as the distances between each of the detected points and the mathematical model in which the parameters are estimated are shorter.

The method of detecting the lane line based on the lidar data may further include identifying, by the processor, symmetry of the detected points based on an arbitrary line with respect to the detected points, and when the symmetry of the detected points is not identified, assigning, by the processor, a weight to the points detected in front of the lidar sensor, calculating distances between each of the detected points and the mathematical model in which the parameters are estimated, multiplying the points by the calculated distances, and setting results obtained by multiplication as the scores.

The identifying of, by the processor, the symmetry of the detected points based on the arbitrary line with respect to the detected points may include classifying, by the processor, the detected points into first points positioned above the arbitrary line and second points positioned below the arbitrary line based on the arbitrary line, overlapping, by the processor, the first points and the second points and determining whether thicknesses of the overlapping first points and second points are greater than or equal to a predetermined length, and when it is determined that the thicknesses of the overlapping first points and second points are greater than or equal to the predetermined length, determining that, by the processor, the detected points have no symmetry.

The method of detecting the lane line based on the lidar data may further include dividing, by the processor, a region including the detected points each estimated as the lane line into grids at regular intervals, averaging, by the processor, positions of the points included in each of the grids and setting the averaged positions as average points, and performing, by the processor, a sampling operation of randomly sampling the points from the average points.

According to another aspect of the present invention, there is provided a system for detecting a lane line based on lidar data, which includes a computing device. The computing device includes a processor, and a memory in which instructions executed by the processor are stored.

The instructions may be implemented to detect points each estimated as a lane line in a lidar data, perform an estimation operation of estimating parameters of a mathematical model using the detected points, perform a setting operation of calculating distances between each of the detected points and the mathematical model in which the parameters are estimated and setting the calculated distances as scores, perform a summation operation of summing the scores, and set the mathematical model having the highest summation score as a lane line.

The system for detecting the lane line based on the lidar data may further include instructions implemented to performing, a sampling operation of randomly sampling points from the detected points, wherein instructions implemented to estimate parameters of a mathematical model using the sampled points.

The system for detecting the lane line based on the lidar data may further include instructions implemented to repeatedly perform the sampling operation, the estimation operation, the setting operation, and the summation operation a predetermined number of times and finding parameters of the mathematical model having a highest summation score, wherein instructions implemented to set the mathematical model having the highest summation score as the lane line.

The instructions may be implemented to assign a higher score as the distances between each of the detected points and the mathematical model in which the parameters are estimated are shorter.

The system for detecting the lane line based on the lidar data may further include instructions implemented to identify symmetry of the detected points based on an arbitrary line with respect to the detected points, and when the symmetry of the detected points is not identified, instructions implemented to assign a weight to the points detected in front of the lidar sensor, calculate distances between each of the detected points and the mathematical model in which the parameters are estimated, multiply the points by the calculated distances, and set results obtained by multiplication as the scores.

The instructions that identify the symmetry of the detected points based on the arbitrary line with respect to the detected points may be implemented to classify the detected points into first points positioned above the arbitrary line and second points positioned below the arbitrary line based on the arbitrary line, overlap the first points and the second points and determine whether thicknesses of the first points and the second points are greater than or equal to a predetermined length, and when it is determined that the thicknesses of the overlapping first points and second points are greater than or equal to the predetermined length, determine that the detected points have no symmetry.

The system for detecting the lane line based on the lidar data may further include instructions implemented to divide a region including the detected points each estimated as the lane line into grids at regular intervals, instructions implemented to average positions of the points included in each of the grids and set the averaged positions as average points, and instructions implemented to perform a sampling operation of randomly sampling the points from the average points.

BRIEF DESCRIPTION OF THE DRAWINGS

In order to gain a more sufficient understanding of the accompanying drawings recited in detailed descriptions of the present invention, a detailed description of each drawing is provided.

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
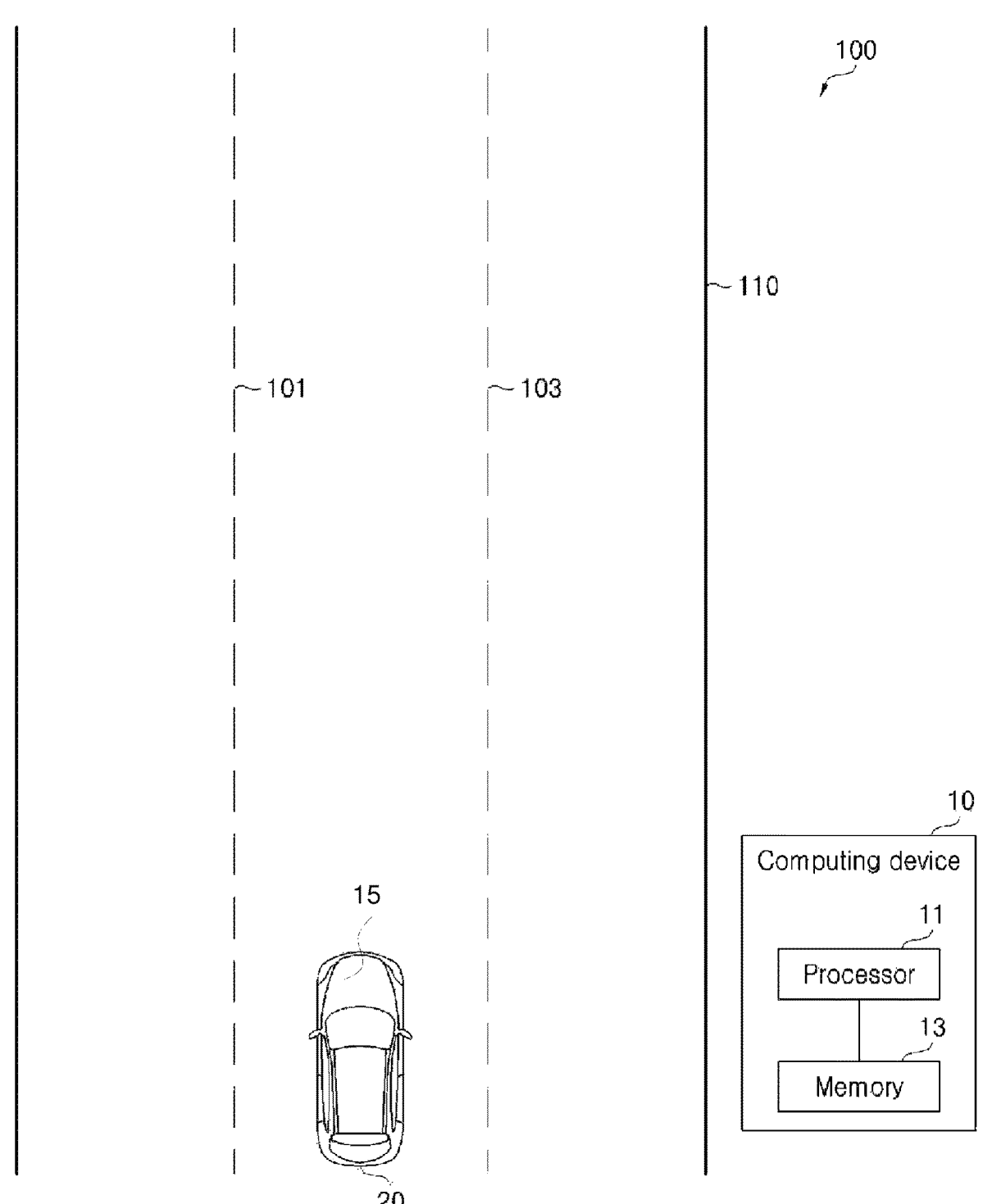
FIG. 1 shows a block diagram of a system for detecting a lane line based on lidar data according to an embodiment of the present invention.

FIG. 1 shows a block diagram of a system for detecting a lane line based on lidar data according to an embodiment of the present invention.

Referring to FIG. 1, a system 100 for detecting a lane line based on lidar data is a system capable of detecting a lane line 101 or 103 on the basis of lidar data. The lane line 101 or 103 refers to a line painted on a road 110 for a vehicle 20.

The system 100 for detecting the lane line based on the lidar data includes a computing device 10. The computing device 10 is an electronic device such as a server, a personal computer (PC), a laptop computer, a smartphone, or a tablet PC. In some embodiments, the computing device 10 may be implemented as one electronic device inside the vehicle 20. The computing device 10 includes a processor 11 and a memory 13 in which instructions to be executed by the processor 11 are stored. The instructions are implemented such that a method of detecting a lane line based on lidar data is performed.

The vehicle 20 includes a lidar sensor (15). While the vehicle 20 moves, the lidar sensor scans its surrounding environment. Lidar data is generated by the lidar sensor. The lidar data includes three-dimensional (3D) points. The 3D points may be referred to as a 3D point cloud. The lidar data may include 3D (X, Y, Z) coordinate information and strength information indicating a return strength of a laser pulse generated by the lidar sensor.

When the computing device 10 is implemented as a separate device outside the vehicle 20, the processor 11 may receive the generated lidar data from the lidar sensor of the vehicle 20 through a network. In some embodiments, when the computing device 10 is implemented as one electronic device inside the vehicle 20, the processor 11 may receive the generated lidar data from the lidar sensor of the vehicle 20 through an internal communication bus.

The processor 11 converts the 3D points into two-dimensional (2D) coordinates by projecting the 3D points onto a 2D plane. That is, the 3D (X, Y, Z) coordinate information is converted into 2D (X, Y) coordinates. In this case, a Z coordinate may be set to 0 or to infinity.

Further, the processor 11 may correct an error that occurs due to a position at which the lidar sensor is installed in the vehicle 20.

Figure 2:
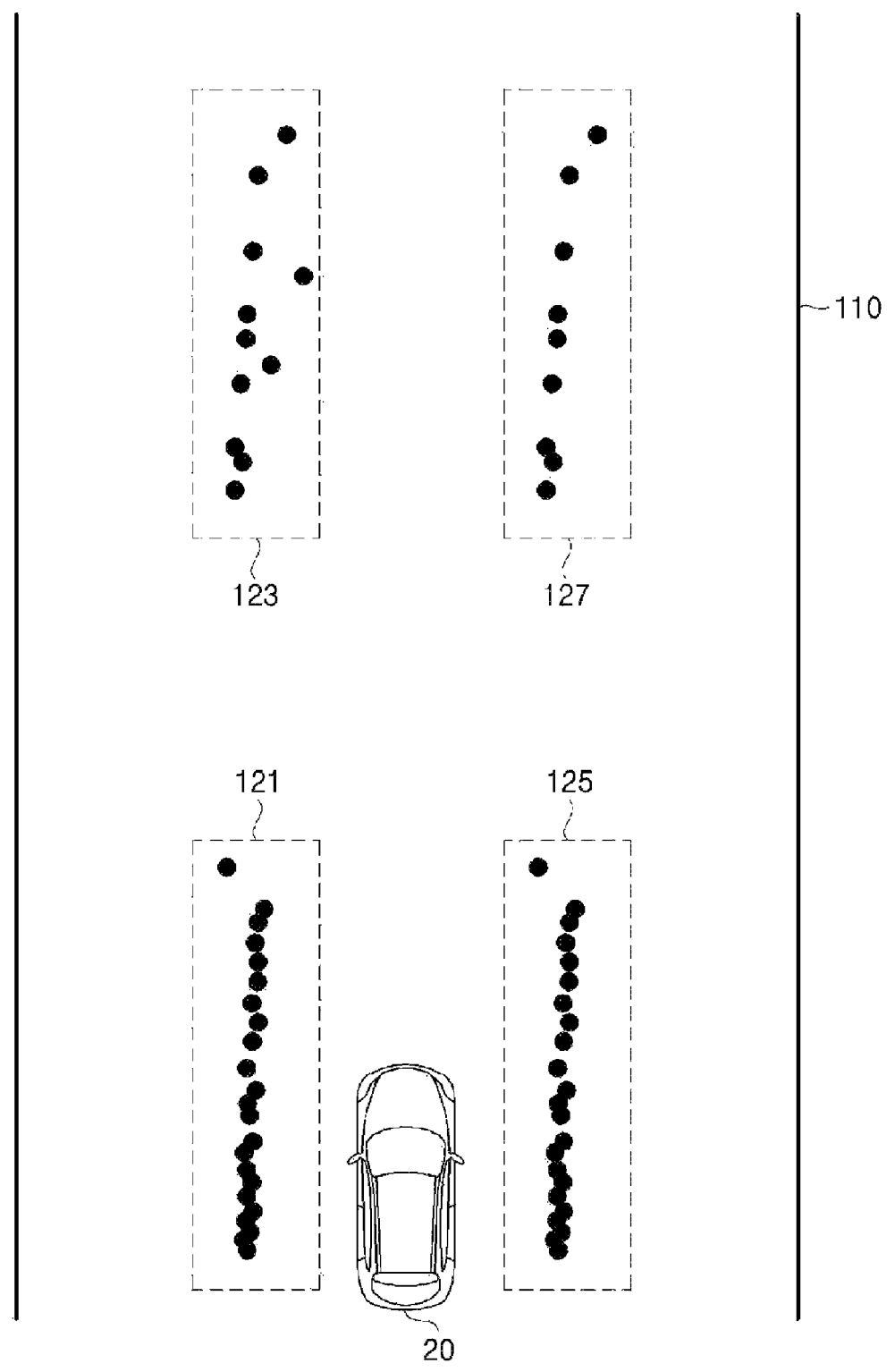
FIG. 2 shows an image of points each estimated as a lane line in lidar data generated by a vehicle shown in FIG. 1.

FIG. 2 shows an image of points each estimated as a lane line in the lidar data generated by the vehicle shown in FIG. 1.

Referring to FIGS. 1 and 2, the processor 11 detects points 121, 123, 125, or 127 each estimated as the lane line 101 or 103 in the lidar data. The lidar data may include a plurality of points. That is, the processor 11 detects the points 121, 123, 125, or 127 each estimated as the lane line 101 or 103 from the plurality of points generated by the lidar sensor. The plurality of points generated by the lidar sensor have different strengths according to a material of a scanned object. For example, a strength of asphalt ranges from 1 to 5. A strength of a tree ranges from 1 to 10. A strength of pavement ranges from 5 to 20. A strength of the lane line 101 or 103 ranges from 30 to 70. A strength of a vehicle ranges from 20 to 80. The lidar data includes strength information. The processor 11 may detect the points 121, 123, 125, or 127 each estimated as the lane line 101 or 103 in the lidar data according to the strength information included in the lidar data. For example, when the strength information included in the lidar data ranges from 30 to 70, the processor 11 may extract the points 121, 123, 125, or 127 as points each estimated as the lane line 101 or 103.

Figure 3:
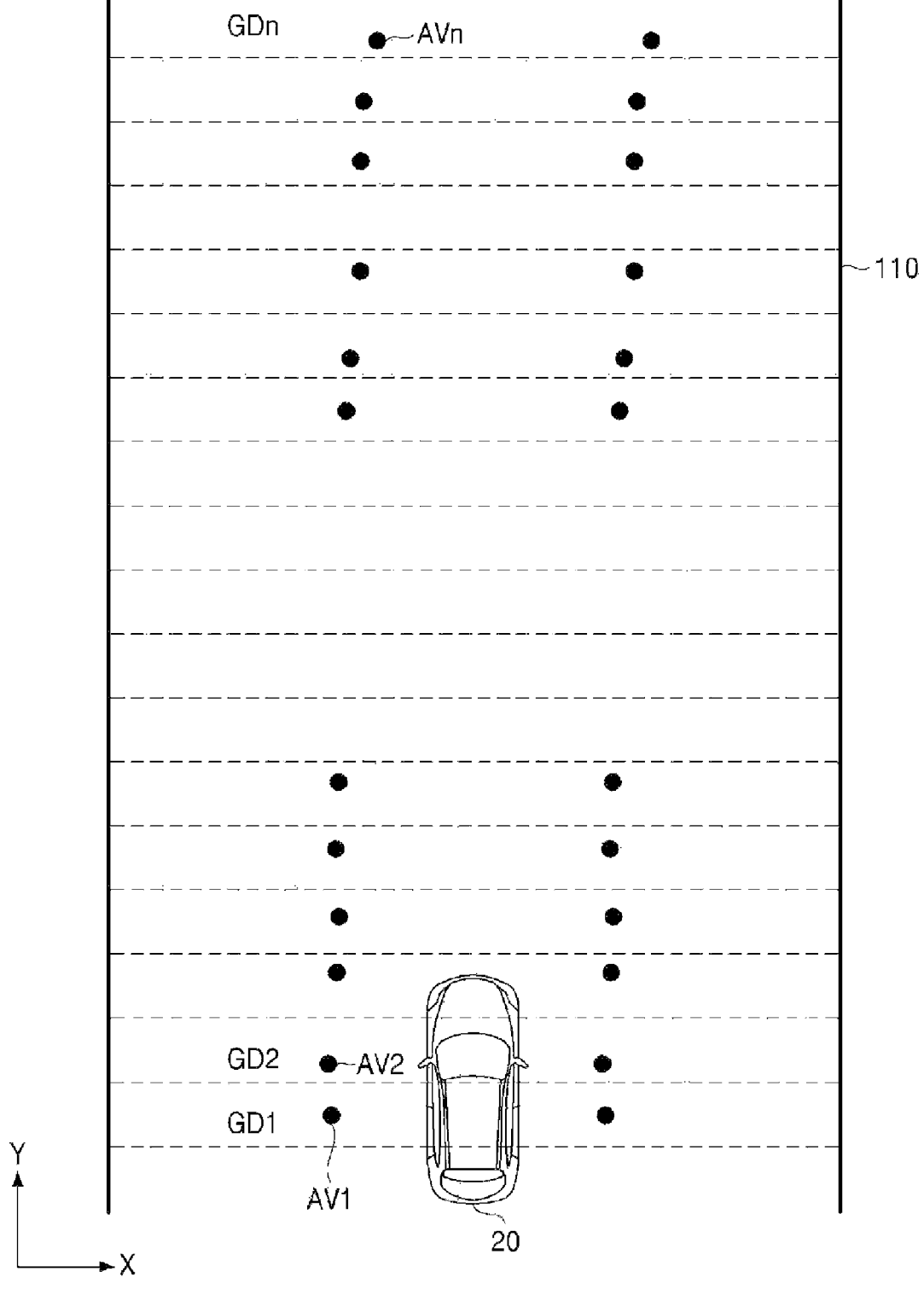
FIG. 3 shows an image of points obtained by processing the points each estimated as the lane line shown in FIG. 2.

FIG. 3 shows an image of points obtained by processing the points each estimated as the lane line shown in FIG. 2.

Referring to FIGS. 1 to 3, the processor 11 divides a region including the detected points each estimated as the lane line into grids GD1 to GDn (here, n is a natural number) at regular intervals.

In the image shown in FIG. 2, the processor 11 divides a region including the detected points each estimated as the lane line into grids GD1 to GDn (here, n is a natural number) at regular intervals. In the image shown in FIG. 2, when the processor 11 divides the region including the detected points each estimated as the lane line into the grids GD1 to GDn (n is a natural number) at regular intervals, the plurality of points may be included in each of the grids GD1 to GDn. For example, four points may be included in a first grid GD1. Five points may be included in a second grid GD2.

The processor 11 averages positions of the points included in each of the grids GD1 to GDn and sets the averaged positions as average points AV1 to AVn (here, n is a natural number). The positions of the points included in each of the grids GD1 to GDn may be expressed as (X, Y) coordinates. Specifically, the processor 11 averages positions of X coordinates of the points included in each of the grids GD1 to GDn and sets the averaged positions as average points AV1 to AVn (here, n is a natural number). When it is assumed that four points are included in the first grid GD1, the processor 11 averages positions of X coordinates of the four points included in the first grid GD1 and sets the averaged positions as one average point AV1. That is, each average point AV1, AV2, . . . , or AVn is included in a corresponding one of the grids GD1 to GDn. One average point AV1 is included in the first grid GD1. One average point AV2 is included in the second grid GD2.

Referring to FIG. 2, due to the characteristics of the lidar sensor, among the points 121, 123, 125, or 127 each estimated as the lane line 101 or 103 in the lidar data, there may be more points 121 or 125 that are relatively closer to the vehicle 20 than points 123 or 127 that are relatively farther from the vehicle 20. Therefore, the processor 11 may extract more points 121 or 125 that are relatively closer to the vehicle 20 than points 123 or 127 that are relatively farther from the vehicle 20. This may cause an error when the lane line 101 or 103 is detected. The error may lead to incorrect detection of the lane line 101 or 103. Therefore, the error may be prevented by setting the average points AV1, AV2, . . . , and AVn as shown in FIG. 3.

Figure 4:
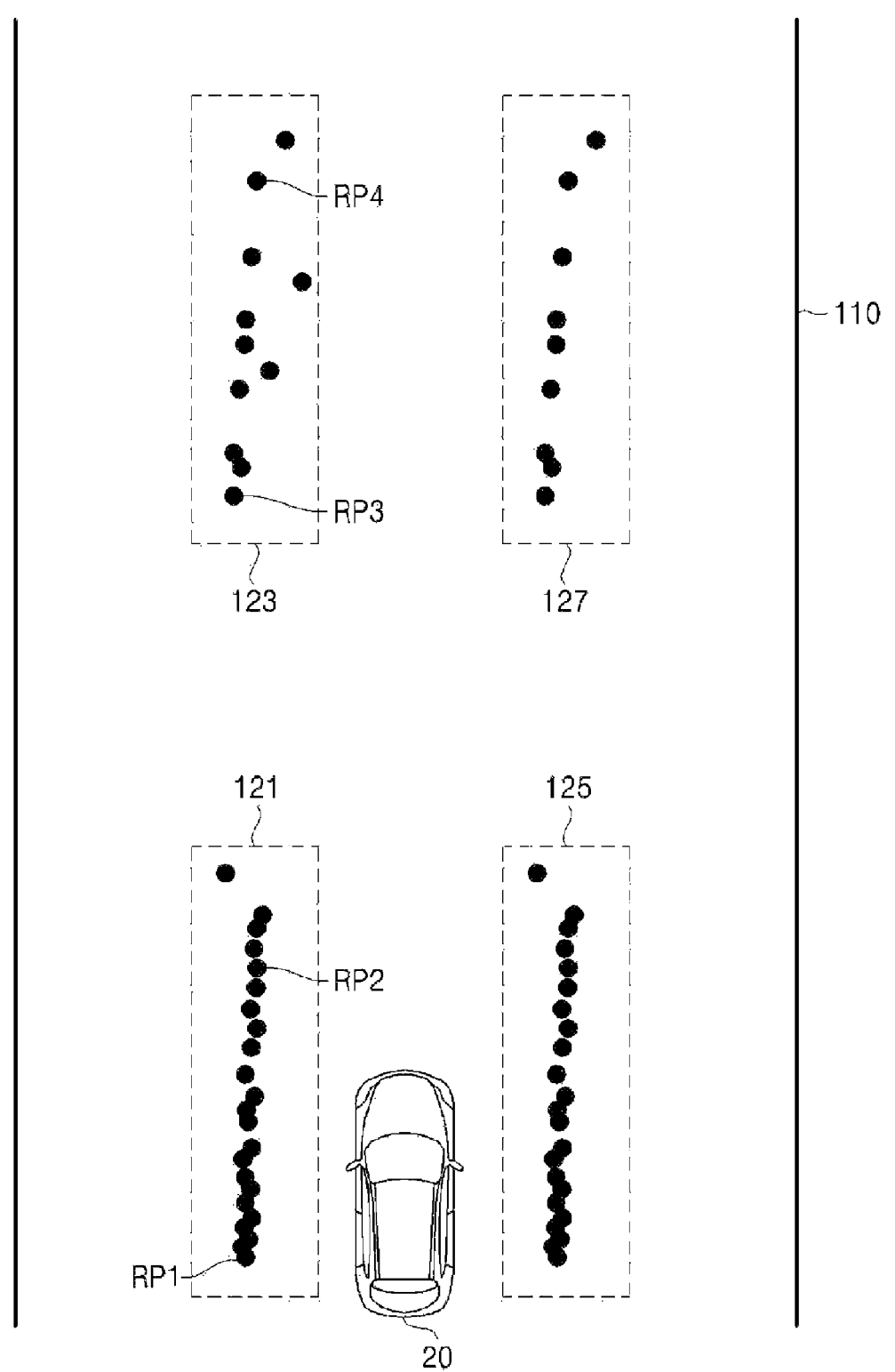
FIG. 4 shows an image of lidar data for describing an operation of a processor according to an embodiment of the present invention.

FIG. 4 shows an image of lidar data for describing an operation of a processor according to an embodiment of the present invention.

Referring to FIGS. 1 and 4, the processor 11 performs a sampling operation of randomly sampling points (e.g., RP1, RP2, RP3, and RP4) from the detected points 121, 123, 125, or 127. The sampling operation refers to an operation of randomly extracting the points (e.g., RP1, RP2, RP3, and RP4) from the detected points 121, 123, 125, or 127. In FIG. 4, four points (e.g., RP1, RP2, RP3, and RP4) are shown as being randomly sampled. In some embodiments, the number of randomly extracted points may vary.

Figure 5:
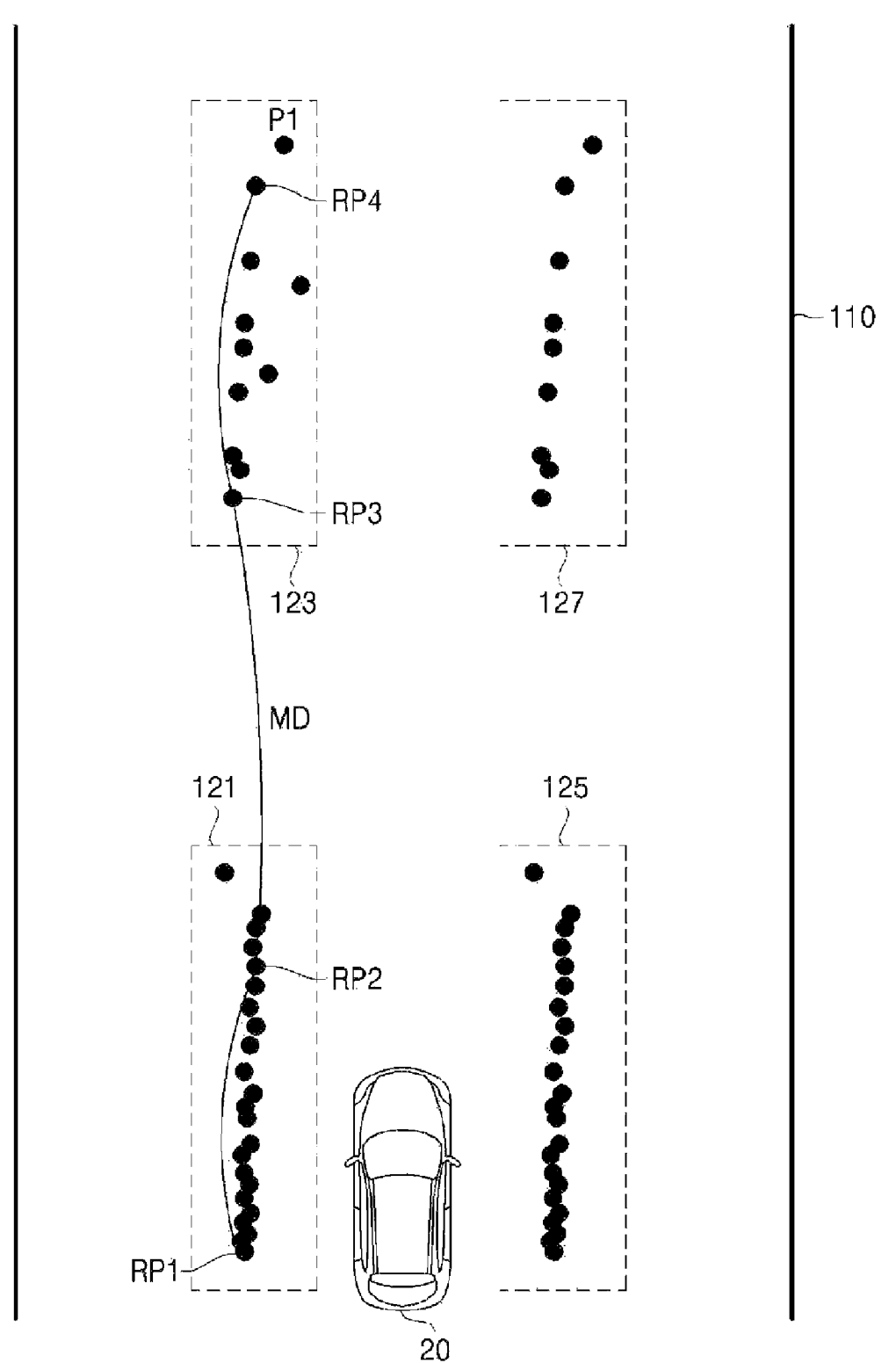
FIG. 5 shows an image of lidar data for describing an operation of the processor according to the embodiment of the present invention.

FIG. 5 shows an image of lidar data for describing an operation of the processor according to the embodiment of the present invention.

Referring to FIGS. 1 and 5, the processor 11 performs an estimation operation of estimating parameters of a mathematical model MD using the sampled points (e.g., RP1, RP2, RP3, and RP4). The mathematical model MD refers to a polynomial expression. The parameters of the mathematical model MD refer to coefficients or constants of the polynomial expression. The processor 11 may estimate coefficients or constants of any polynomial expression using the sampled points (e.g., RP1, RP2, RP3, and RP4). That is, the processor 11 may generate a specific polynomial expression. In FIG. 5, a graph of a specific polynomial expression MD is shown.

Figure 6:
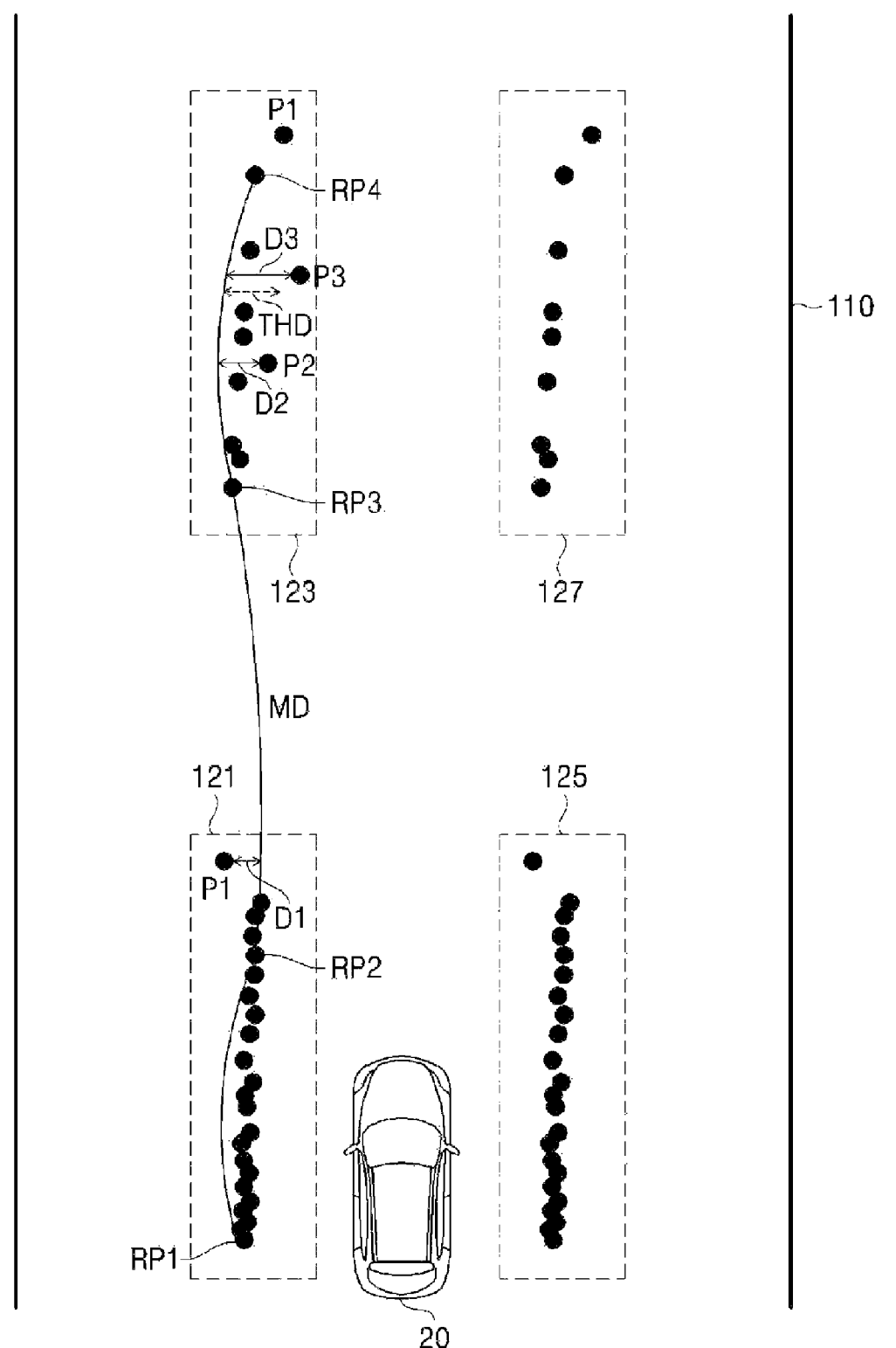
FIG. 6 shows an image of lidar data for describing an operation of the processor according to the embodiment of the present invention.

FIG. 6 shows an image of lidar data for describing an operation of the processor according to the embodiment of the present invention.

Referring to FIGS. 1 and 6, the processor 11 performs a setting operation of calculating distances (e.g., D1, D2, and D3) between each of the detected points 121 and 123 and the mathematical model MD in which the parameters are estimated and setting the calculated distances D1, D2, and D3 as scores. For example, the processor 11 calculates a first distance D1 between a first point P1 and the mathematical model MD in which the parameters are estimated. The processor 11 calculates a second distance D2 between a second point P2 and the mathematical model MD in which the parameters are estimated. The processor 11 calculates a third distance D3 between a third point P3 and the mathematical model MD in which the parameters are estimated. Although only three calculated distances D1, D2, and D3 are shown in FIG. 6, the processor 11 may calculate the distances between each of the detected points 121 and 123 and the mathematical model MD in which the parameters are estimated and set the calculated distances as the scores. Further, in some embodiments, the number of points used to calculate the distances may vary.

The score according to the distances between each of the detected points 121 and 123 and the mathematical model MD in which the parameters are estimated may be expressed by the following equation.

$$SCi = 1 + \frac{(THD - DSi)}{THD} \qquad \text{[Equation 1]}$$

SCi denotes a score of an $i^{th}$ detected point, THD denotes an allowable distance, and DSi denotes a distance between the $i^{th}$ detected point and the mathematical model MD.

Scores of the remaining points of the detected points 121 and 123 may also be calculated.

The processor 11 performs a summation operation of summing the scores.

For example, the processor 11 may sum a first score SC1 of the first point P1 to an ith score SCi of the $i^{th}$ point Pi.

The processor 11 repeatedly performs the sampling operation, the estimation operation, the setting operation, and the summation operation a predetermined number of times and finds parameters of the mathematical model MD having a highest summation score. When the processor 11 repeatedly performs the sampling operation, the estimation operation, the setting operation, and the summation operation the predetermined number of times, a plurality of mathematical models are generated.

The processor 11 sets the mathematical model MD having the highest summation score as a lane line. That is, when it is assumed that the mathematical model MD shown in FIG. 6 has the highest summation score, the processor 11 may recognize the mathematical model MD shown in FIG. 6 as the lane line 101 shown in FIG. 1.

Figure 7:
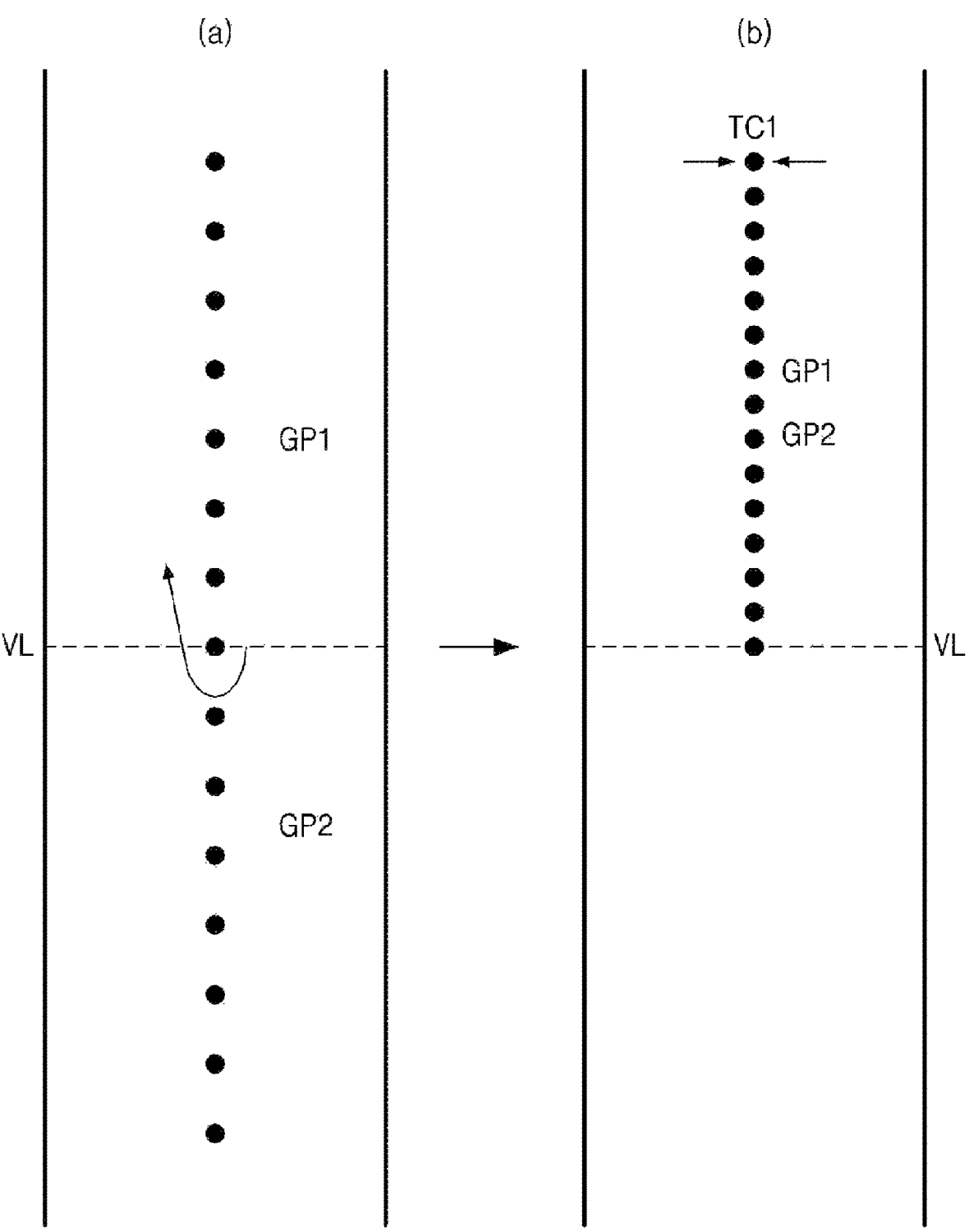
FIG. 7 shows an image of lidar data for describing an operation of a processor according to another embodiment of the present invention.
Figure 8:
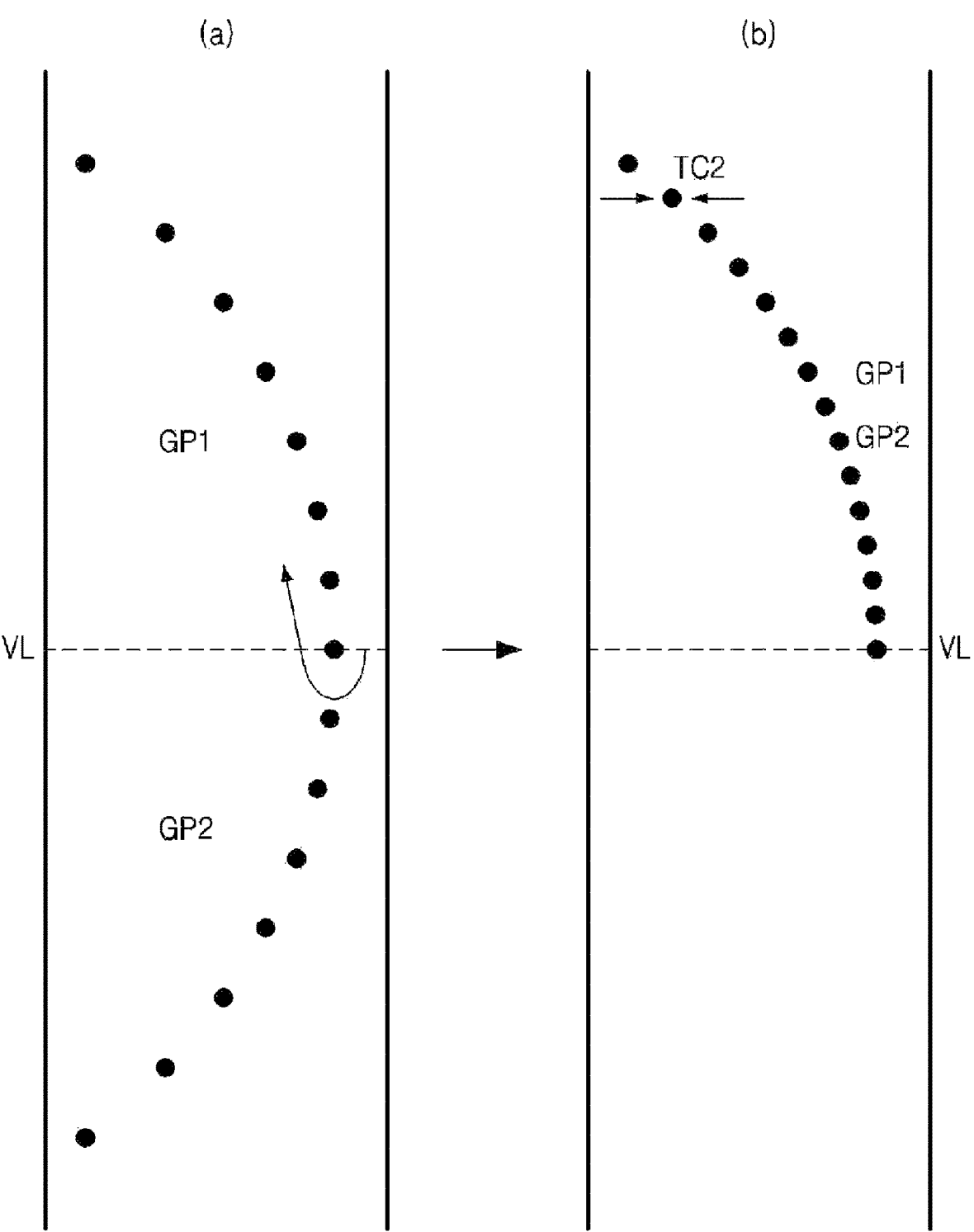
FIG. 8 shows an image of lidar data for describing an operation of the processor according to another embodiment of the present invention.
Figure 9:
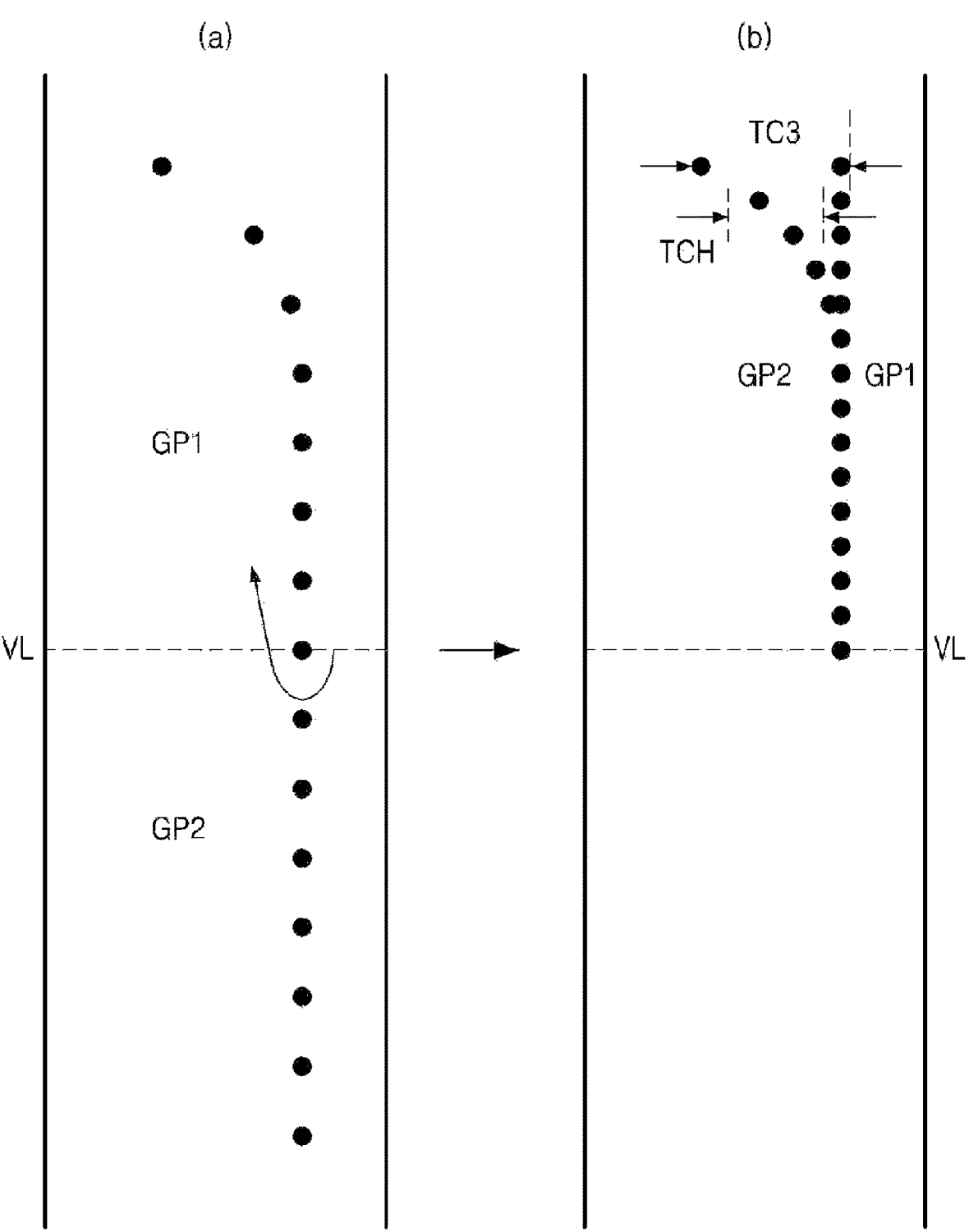
FIG. 9 shows an image of lidar data for describing an operation of the processor according to another embodiment of the present invention.

FIGS. 7 to 9 show images of lidar data for describing operations of a processor according to another embodiment of the present invention.

FIG. 7A shows an image of lidar data before first points and second points overlap.

Referring to FIGS. 1 and 7A, the processor 11 identifies the symmetry of detected points GP1 and GP2 based on an arbitrary line VL with respect to detected points. The arbitrary line VL refers to an imaginary line.

The processor 11 classifies the detected points GP1 and GP2 into first points GP1 positioned above the arbitrary line VL and second points GP2 positioned below the arbitrary line VL based on the arbitrary line VL.

FIG. 7B shows an image of lidar data after the first points and the second points overlap.

Referring to FIGS. 1 and 7B, the processor 11 overlaps the first points GP1 and the second points GP2 and determines whether thicknesses TC1 of the overlapping first points GP1 and second points GP2 are greater than or equal to a predetermined length. The overlap means that Y-axis coordinates of the first points GP1 or the second points GP2 are reversely changed so that the first points GP1 and the second points GP2 are mapped to each other. In this case, coordinates of the first points GP1 or the second points GP2 are expressed as (X, Y). Positions of the first points GP1 or the second points GP2 are relatively expressed with the arbitrary line VL as the origin. For example, when coordinates of the arbitrary line VL are (0,0) and coordinates of any one of the second points GP2 are (2, −3), the processor 11 changes coordinates (2, −3) of any one of the second points GP2 to coordinates (2, 3). Since the coordinates of any one of the second points GP2 are changed to (2, 3), the any one of the second points GP2 may overlap any one of the first points GP1.

In FIG. 7B, when the thicknesses TC1 of the overlapping first points GP1 and second points GP2 are less than or equal to the predetermined length, the processor 11 determines that the first points GP1 and the second points GP2 have symmetry. In FIG. 7B, since the first points GP1 and the second points GP2 are positioned side by side in a line, the first points GP1 and the second points GP2 have symmetry. The predetermined length refers to a length of about a predetermined length TCH shown in FIG. 9B.

FIG. 8A shows an image of lidar data before first points and second points overlap. FIG. 8B shows an image of lidar data after the first points and the second points overlap.

Referring to FIGS. 1 and 8, the processor 11 overlaps first points GP1 and second points GP2 and determines whether thicknesses TC2 of the overlapping first points GP1 and second points GP2 are greater than or equal to a predetermined length. When the thicknesses TC2 of the overlapping first points GP1 and second points GP2 are less than or equal to the predetermined length in FIG. 8B, the processor 11 determines that the first points GP1 and the second points GP2 have symmetry. In FIG. 8B, since the first points GP1 and the second points GP2 completely overlap, the first points GP1 and the second points GP2 have symmetry. The predetermined length refers to a length of about the predetermined length TCH shown in FIG. 9B.

FIG. 9A shows an image of lidar data before first points and second points overlap. FIG. 9B shows an image of lidar data after the first points and the second points overlap.

Referring to FIGS. 1 and 9A, the processor 11 identifies the symmetry of detected points GP1 and GP2 based on an arbitrary line VL with respect to the detected points.

The processor 11 classifies the detected points GP1 and GP2 into first points GP1 positioned above the arbitrary line VL and second points GP2 positioned below the arbitrary line VL based on the arbitrary line VL.

FIG. 9B shows an image of the lidar data after the first points and the second points overlap.

Referring to FIGS. 1 and 9B, the processor 11 overlaps the first points GP1 and the second points GP2 and determines whether thicknesses TC3 of the overlapping first points GP1 and second points GP2 are greater than or equal to the predetermined length TCH. The thickness TC3 of the first points GP1 and the second points GP2 refers to a maximum value TC3 of the thicknesses of the first points GP1 and the second points GP2.

In FIG. 9B, when the thicknesses TC3 of the overlapping first points GP1 and second points GP2 are less than or equal to the predetermined length TCH, the processor 11 determines that the first points GP1 and the second points GP2 have symmetry. In FIG. 9B, since the first points GP1 and the second points GP2 do not completely overlap, the first points GP1 and the second points GP2 have no symmetry.

When the symmetry of the detected points is not identified, the processor 11 assigns a weight to points GP1 detected in front of the lidar sensor, calculates distances between the respective detected points GP1 and the mathematical model MD in which the parameters are estimated, multiplies the points by the calculated distances, and sets results obtained by multiplication as the scores.

For example, the scores for the points GP1 detected in front of the lidar sensor may be calculated as in Equation 2 below.

$$SCGPi = \omega \left( 1 + \frac{(THD - DSi)}{THD} \right) \qquad \text{[Equation 2]}$$

SCGPi denotes a score of an $i^{th}$ detected point among the points GP1 detected in front of the lidar sensor, THD denotes an allowable distance, and DSi denotes a distance between the $i^{th}$ detected point among the points GP1 detected in front of the lidar sensor and the mathematical model MD. ω denotes the weight. The weight ω may be set to an arbitrary integer.

On the other hand, the processor 11 sets the scores according to Equation 1 above without assigning a weight to the points GP2 detected from behind the lidar sensor.

Therefore, since the points GP1 detected in front of the lidar sensor have relatively higher scores than the points GP2 detected from the rear of the lidar sensor, an error can be reduced in lane line detection using the points GP1 and GP2 having no symmetry.

When it is assumed that the first points GP1 and the second points GP2 have no symmetry as shown in FIG. 9, the lane line is not accurately detected due to the above error when the scores are not set in a manner of assigning a weight.

Figure 10:
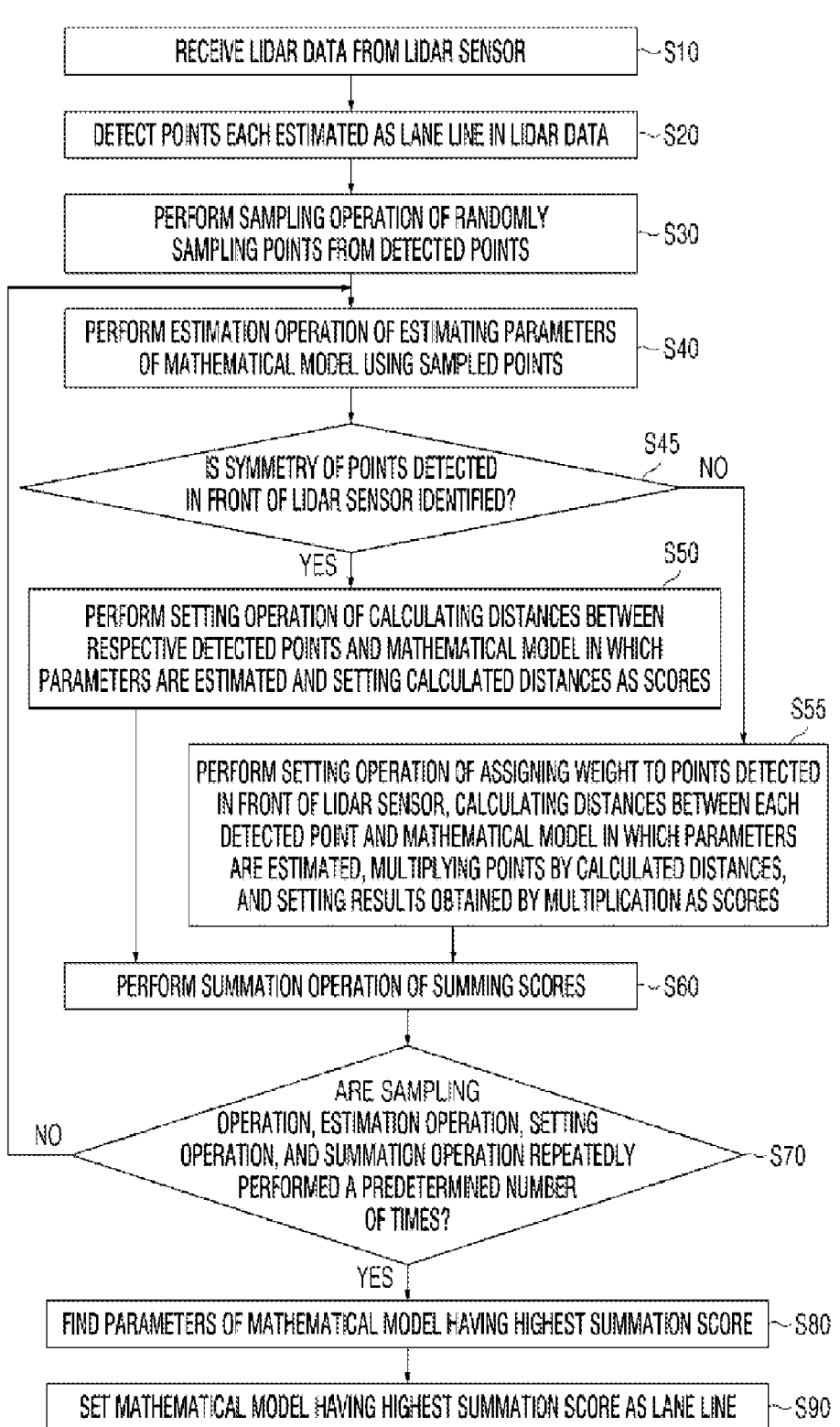
FIG. 10 is a flowchart for describing a method of detecting a lane line based on lidar data according to an embodiment of the present invention.

FIG. 10 is a flowchart for describing a method of detecting a lane line based on lidar data according to an embodiment of the present invention.

Referring to FIGS. 1 to 10, a processor 11 receives lidar data from a lidar sensor (S10).

The processor 11 detects points 121, 123, 125, or 127 each estimated as a lane line in the lidar data (S20).

The processor 11 performs a sampling operation of randomly sampling points from the detected points (S30).

The processor 11 performs an estimation operation of estimating parameters of a mathematical model MD using the sampled points (S40).

The processor 11 identifies the symmetry of the detected points based on an arbitrary line VL with respect to the detected points (S45).

When the symmetry of the detected points based on the arbitrary line VL with respect to the detected points is identified, the processor 11 performs a setting operation of calculating distances between each of the detected points and the mathematical model MD in which parameters are estimated and setting the calculated distances as scores (S50).

When the symmetry of the detected points based on the arbitrary line VL with respect to the detected points is not identified, the processor 11 performs a setting operation of calculating and assigning a weight to the points detected in front of the lidar sensor, calculating the distances between each of the detected points and the mathematical model MD in which the parameters are estimated, multiplying the points by the calculated distances, and setting results obtained by multiplication as the scores (S55).

The processor 11 performs a summation operation of summing the scores (S60).

The processor 11 determines whether the sampling operation, the estimation operation, the setting operation, and the summation operation are repeatedly performed a predetermined number of times (S70). The predetermined number of times may be arbitrarily set.

When it is determined that the sampling operation, the estimation operation, the setting operation, and the summation operation are repeatedly performed the predetermined number of times, the processor 11 finds parameters of the mathematical model MD having a highest summation score (S80).

The processor 11 performs a setting operation of setting the mathematical model MD having the highest summation score as a lane line (S90).

According to the method and system for detecting the lane line based on the lidar data according to the embodiments of the present invention, there is an effect that a mathematical model can be generated from lidar data generated by a lidar sensor, and a lane line can be accurately detected based on distances between the generated mathematical model and points of the lidar data.

While the present invention has been described with reference to exemplary embodiments illustrated in the accompanying drawings, these embodiments should be considered in a descriptive sense only, and it should be understood by those skilled in the art that various alterations and equivalent other embodiment may be made. Therefore, the scope of the present invention is defined by the appended claims.

What is claimed is:

1. A method of detecting a lane line based on lidar data, the method being executed by a computing device mounted on a vehicle and coupled to a lidar sensor, the computing device comprising a processor, the method comprising:

scanning, by a lidar sensor mounted on a vehicle, a surrounding environment of the vehicle, and generating, by the lidar sensor, lidar data;

detecting, by a processor mounted on the vehicle and coupled to the lidar sensor through an internal communication bus, points each estimated as a lane line in the lidar data;

dividing, by the processor, a region including the detected points into grids at regular intervals, and averaging positions of the detected points included in each grid to generate average points;

performing, by the processor, a sampling operation of randomly sampling points from the average points;

identifying, by the processor, symmetry of the detected points based on an arbitrary line;

performing, by the processor, an estimation operation of estimating parameters of a mathematical model using the sampled points;

performing, by the processor, a setting operation of calculating distances between each of the detected points and the mathematical model in which the parameters are estimated and setting the calculated distances as scores;

when the symmetry of the detected points is not identified, assigning, by the processor, a weight to points detected in front of the lidar sensor and generating the scores based on the distances and the weight;

performing, by the processor, a summation operation of summing the scores; and setting, by the processor, the mathematical model determined according to the summation score as a lane line, wherein the sampling operation, the estimation operation, the setting operation, and the summation operation are repeatedly performed a predetermined number of times and parameters of the mathematical model having a highest summation score are selected.

2. The method of claim 1, wherein the processor assigns a higher score as the distances between each of the detected points and the mathematical model in which the parameters are estimated are shorter.

3. The method of claim 1, wherein the identifying of, by the processor, the symmetry of the detected points based on the arbitrary line with respect to the detected points includes:

classifying, by the processor, the detected points into first points positioned above the arbitrary line and second points positioned below the arbitrary line based on the arbitrary line;

overlapping, by the processor, the first points and the second points and determining whether thicknesses of the overlapping first points and second points are greater than or equal to a predetermined length; and when it is determined that the thicknesses of the overlapping first points and second points are greater than or equal to the predetermined length, determining that, by the processor, the detected points have no symmetry.

4. A system for detecting a lane line based on lidar data, the system comprising:

a lidar sensor mounted on a vehicle and configured to scan a surrounding environment of the vehicle and generate lidar data; and a computing device mounted on the vehicle and coupled to the lidar sensor through an internal communication bus, wherein the computing device includes:

a processor; and a memory in which instructions executed by the processor are stored, and the instructions are implemented to:

detect points each estimated as a lane line in a lidar data, divide a region including the detected points into grids at regular intervals, and average positions of points included in each grid to generate average points to compensate for point density variations based on a distance from a lidar sensor, perform a sampling operation of randomly sampling points from the average points to generate sampled points, identify symmetry of the detected points based on an arbitrary line, perform an estimation operation of estimating parameters of a mathematical model using the detected points, perform a setting operation of calculating distances between each of the detected points and the mathematical model in which the parameters are estimated and setting the calculated distances as scores, when the symmetry is not identified, assign a weight to points detected in front of the lidar sensor and generate the scores based on the distances and the weight, perform a summation operation of summing the scores, and set the mathematical model determined according to the summation score as a lane line, repeatedly perform the sampling operation, the estimation operation, the setting operation, and the summation operation a predetermined number of times, and select parameters of the mathematical model having a highest summation score.

5. The system of claim 4, wherein the instructions are implemented to assign a higher score as the distances between each of the detected points and the mathematical model in which the parameters are estimated are shorter.

6. The system of claim 4, further comprising:

instructions implemented to identify symmetry of the detected points based on an arbitrary line with respect to the detected points; and when the symmetry of the detected points is not identified, instructions implemented to assign a weight to the points detected in front of the lidar sensor, calculate distances between each of the detected points and the mathematical model in which the parameters are estimated, multiply the points by the calculated distances, and set results obtained by multiplication as the scores.

7. The system of claim 4, wherein the instructions that identify the symmetry of the detected points based on the arbitrary line with respect to the detected points are implemented to:

classify the detected points into first points positioned above the arbitrary line and second points positioned below the arbitrary line based on the arbitrary line;

overlap the first points and the second points and determine whether thicknesses of the first points and the second points are greater than or equal to a predetermined length; and when it is determined that the thicknesses of the overlapping first points and second points are greater than or equal to the predetermined length, determine that the detected points have no symmetry.

* * * * *